M. JAKAB.
MILK RECEPTACLE.
APPLICATION FILED DEC. 29, 1917.

1,267,552.

Patented May 28, 1918.
2 SHEETS—SHEET 1.

Inventor
M. Jakab

By A. M. Wilson
Attorney

M. JAKAB.
MILK RECEPTACLE.
APPLICATION FILED DEC. 29, 1917.
1,267,552.
Patented May 28, 1918.
2 SHEETS—SHEET 2.
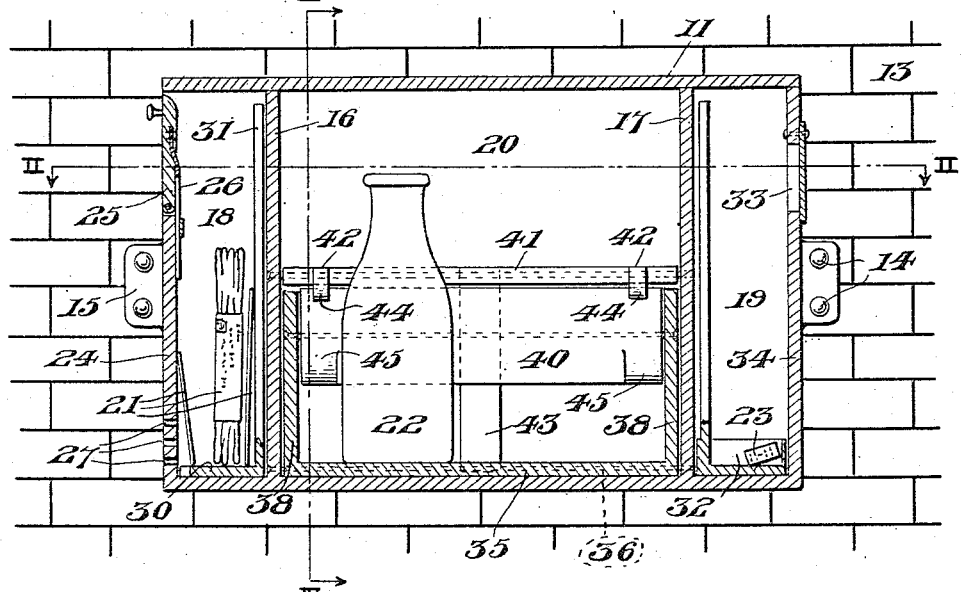
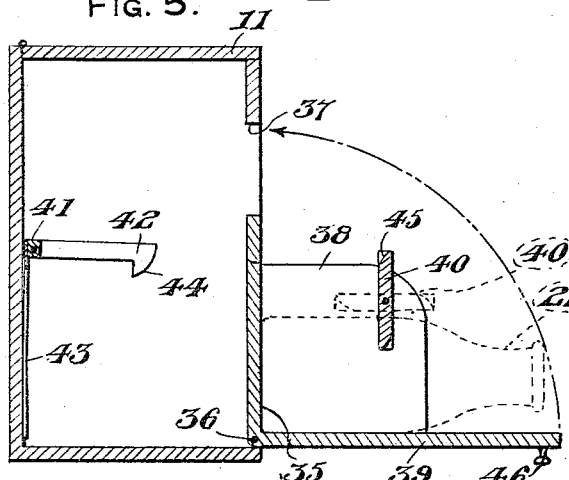
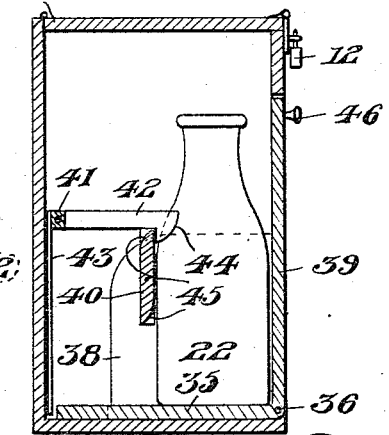
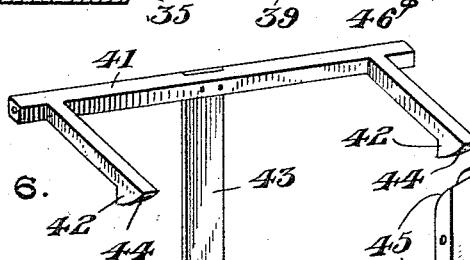
Inventor
M. Jakab
By R. M. Wilson
Attorney

UNITED STATES PATENT OFFICE.

MIKE JAKAB, OF WOODLAND, MAINE, ASSIGNOR OF ONE-FOURTH TO ANDREW GOREJ AND ONE-FOURTH TO JOHN JUHASZ, BOTH OF WOODLAND, MAINE.

MILK-RECEPTACLE.

1,267,552.  Specification of Letters Patent.  Patented May 28, 1918.

Application filed December 29, 1917. Serial No. 209,462.

*To all whom it may concern:*

Be it known that I, MIKE JAKAB, a subject of the King of Hungary, residing at Woodland, in the county of Washington and State of Maine, have invented certain new and useful Improvements in Milk-Receptacles, of which the following is a specification.

This invention relates to certain new and useful improvements in combination milk and letter boxes.

The primary object of the invention is the provision of a receiving device of milk bottles adapted for preventing the bottles from being stolen when delivered at a house by the milk man, the milk being readily removed when the occupant of the house unlocks the device.

It is the ordinary practice of milk venders to leave bottles of milk upon door steps and porches of houses where the same may be stolen as well as exposed to dirt and germs and my invention provides a receiver for the milk bottles for protecting the same against the elements as well as theft, the closing of the device with the bottles arranged therein being adapted for effecting a locking of the receiving structure.

A still further object of the device is to provide a combined milk bottle and mail receiving cabinet, the milk bottles being locked against extraction automatically upon closing the device with the bottles positioned therein, arrangement being made for indicating the amount of milk being furnished by the vender to the purchaser or house-wife.

In the drawings, forming a part of this application and in which like designating characters refer to corresponding parts throughout the several views, Figure 1 is a perspective view of a wall with my device mounted thereon.

Fig. 3 is a vertical longitudinal sectional view of the same.

Fig. 4 is a vertical transverse sectional view taken upon line IV—IV of Fig. 3.

Fig. 5 is a view similar to Fig. 4 with the device open.

Fig. 6 is a perspective view of the locking member detached, and

Fig. 7 is a perspective view of the latch board detached.

Figure 1:
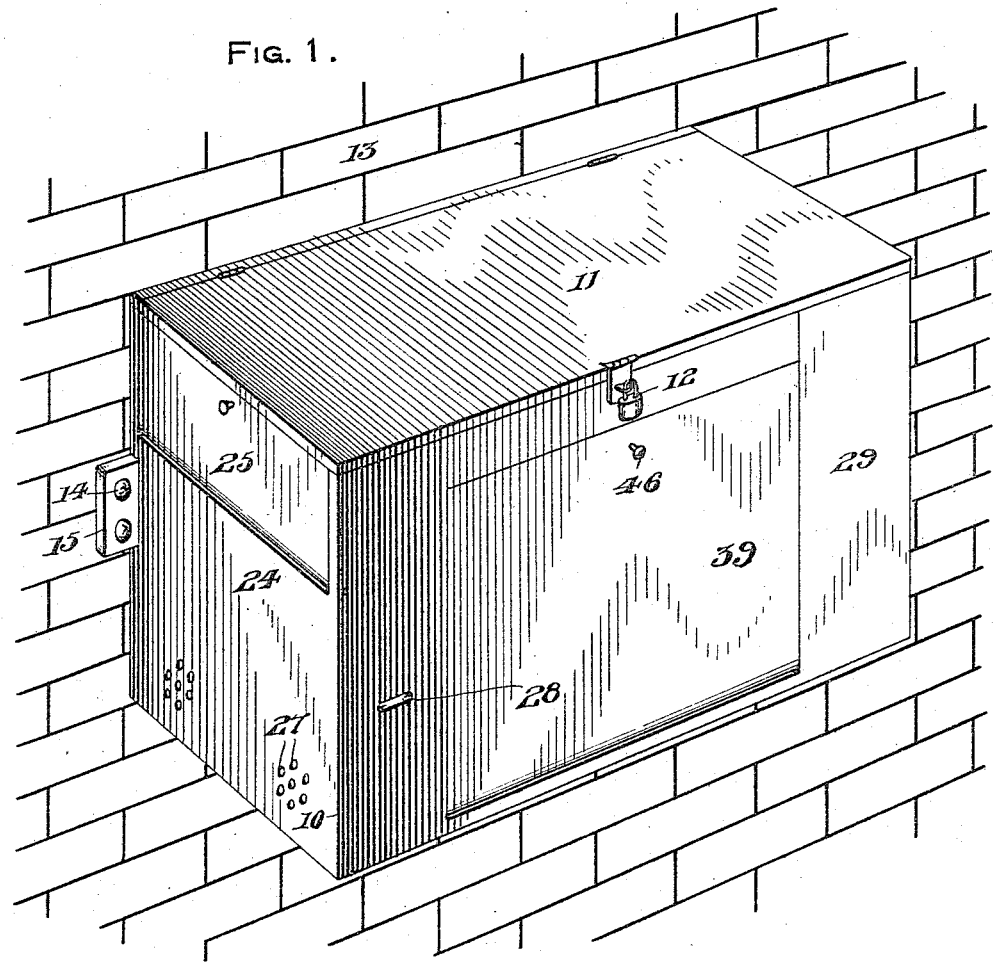
Figure 2:
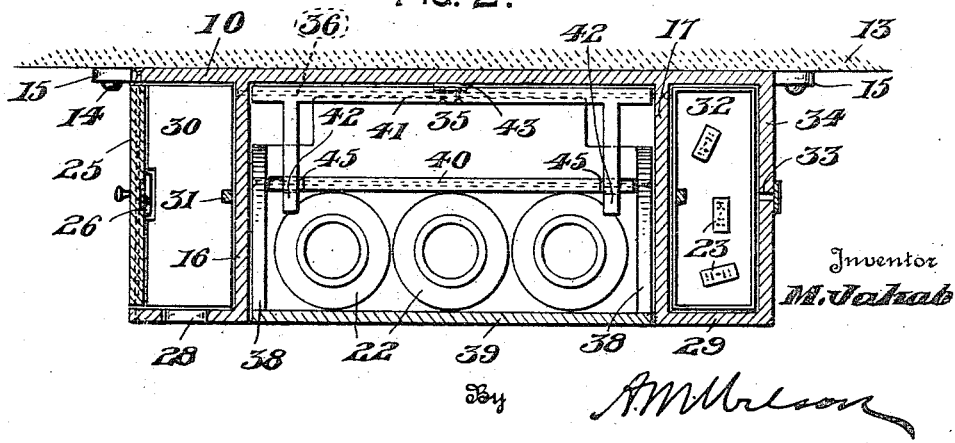
Fig. 2 is a horizontal sectional view thereof taken upon line II—II of Fig. 3.

In the form of my invention herein illustrated, a box or a casing 10 is provided having a hinged lid 11 at the top thereof adapted to be secured in its closed position by means of a padlock 12, while the box may be securely mounted upon a suitable support such as the wall 13 by means of holdfast devices 14 extending through oppositely projecting ears 15 at the back of the box.

The box 10 is arranged with two transverse partitions 16 and 17 dividing the interior of the box into equal sized opposite end compartments 18 and 19 with a relatively larger main compartment 20 located centrally of the box 10 between the said partitions. The compartment 18 is adapted to receive mail matter such as 21 while one or more milk bottles 22 may be locked within the compartment 20 and milk checks or tickets 23 may be placed within the compartment 19.

One end 24 of the box 10 is arranged with a swinging panel 25 adjacent the top thereof for effecting communication with the compartment 18 upon outwardly moving the panel 25 against the action of a leaf spring 26 arranged inwardly of the panel. Sight openings 27 are arranged through the end 24 adjacent the bottom thereof for use in ascertaining whether any mail is contained within the compartment 18. A horizontal slot 28 is provided through the front wall 29 of the box through which passage stamps may be thrust into the compartment 18. An L-shaped lifter 30 is arranged within the compartment 18 normally seated upon the bottom thereof and having a handle 31 whereby the lifter may be elevated together with the mail matter 21 thereof when the lid 11 is opened for convenience in removing the mail from the box.

A similar lifter 32 is arranged in the compartment 19, it being noted that a check 23 is deposited therein through a vertical slot 33 in the end 34 of the box for denoting the quantity of milk which has been placed by the vender in the compartment 20 of the device.

The house-wife or purchaser of the milk may retain the checks 23 and thereby readily determine at any time the total quantity of milk which has been purchased during any interval of time. It will be understood that the lifter 22 may be elevated when the lid 11 is opened for removing the checks 23.

A bottle holder 35 in the form of a trough right-angular in cross section is hinged at the corner thereof as at 36 within the central opening 37 of the front wall 29 of the box 10 and is arranged with opposite ends 38 while the front plate 39 of the bottle holder is adapted for closing the opening 37 when the device is closed with the plate 39 arranged upright.

A latch board 40 is swingingly arranged between the ends 38 of the bottle holder leaving sufficient room between the said board and the plate 39 for insertion of a bottle when the bottle holder is open with the plate 39 horizontally arranged as best indicated in Fig. 5 of the drawings.

A U-shaped retaining frame 41 having forwardly projecting hooked arms 42 is resiliently mounted by means of a spring 43 within the compartment 20, the said arms 42 being within the path of movement of the latch board 40 and having curved forward faces 44 engaged by curved end portions 45 of the board during the closing of the bottle holder 35.

It will be seen that when there is no bottle in the holder 35, the board 40 when engaging the hooks 42 will readily swing for permitting the bottle holder to be readily opened whenever desired.

When one or more bottles 22 are positioned within the holder 35 between the board 40 and the front plate 39 of the holder, the board 40 will be prevented from swinging when the same engages the hooks 42 and the latter will seat over the upwardly positioned edge of the curved corner portions 45 of the latch board thereby retaining the holder 35 in its closed arrangement with the bottles 22 positioned within the box 10. The house-wife or purchaser of the milk 22 by unlocking the padlock 12 may open the lid 11 of the box and remove the milk bottles 22 which will automatically release the latch board 40 and permit the holder 35 to be readily opened and closed at will by means of a handle 46 arranged upon the outer side of the plate 39. The insertion of the milk bottle and the closing of the bottle holder automatically locks the device while the removal of the bottles automatically unlocks the same.

What I claim as new is:—

1. A device of the class described comprising a box having an opening in its front wall, a bottle carrier hinged in the said opening right-angular in cross section, a swinging latch board upon said carrier adapted for restraining engagement by a bottle when positioned in the carrier and a resiliently mounted locking frame within the path of movement of the said latch board during the closing of the carrier.

2. A device of the class described comprising a box having an opening in one wall thereof, a bottle carrier right-angular in cross section hinged in the said opening and having end walls, a latch board pivoted between the end walls of the carrier positioned a distance from the front plate of the carrier equal to the diameter of a milk bottle adapted for reception by the device and a locking frame resiliently mounted in the box adapted for engaging the board when the latter is in its upright position with the carrier closed within the box.

3. A device of the class described comprising a box having an opening in one wall thereof, a bottle carrier right-angular in cross section hinged in said opening and having end walls, a latch board pivoted between the end walls of the carrier positioned a distance from the front plate of the carrier equal to the diameter of a milk bottle adapted for reception by the device, a locking frame resiliently mounted in the box adapted for engaging the board when the latter is in its upright position with the carrier closed within the box, and with a bottle within the carrier restrainingly positioned adjacent the said board, the said locking frame adapted for imparting swinging movement to the board in the absence of a milk bottle within the carrier and a lid upon the box above the carrier.

4. In combination with a box having an opening in its front wall and further having a hinged lid upon the top thereof, a bottle carrier hinged to the box within said opening, a latch board pivoted to said carrier, the carrier being adapted to have a bottle positioned therein within the path of movement of the board to prevent the swinging of the board, and a locking frame within the box within the path of movement of the board during the closing of the carrier.

In testimony whereof I affix my signature.

MIKE JAKAB.